Figure 1:
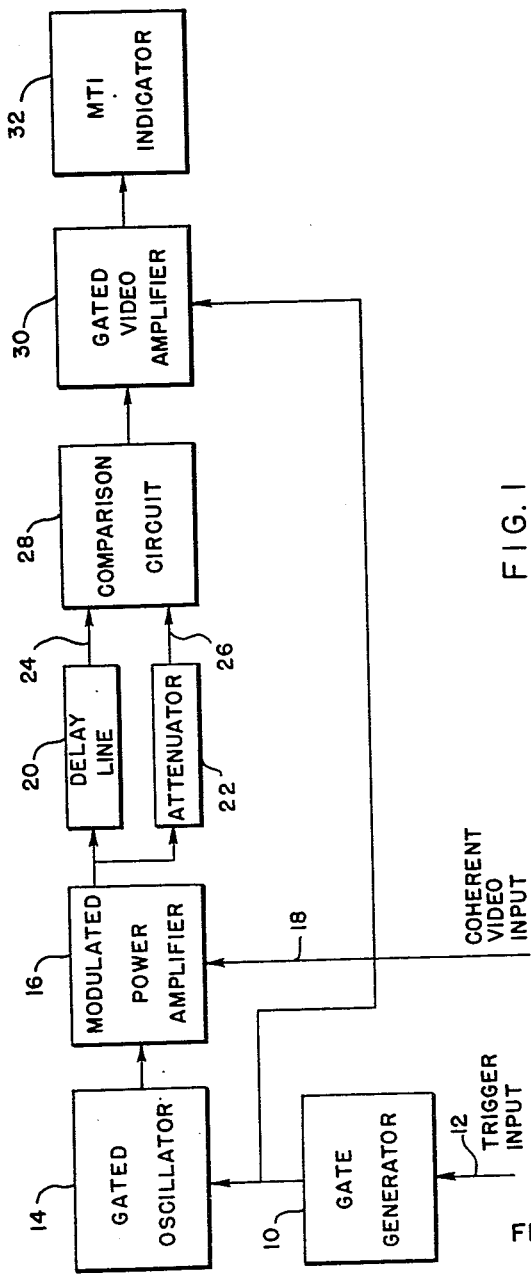

INVENTOR
FREDERIC CUNNINGHAM JR.
BY
William D. Hall.
ATTORNEY

March 17, 1953　　F. CUNNINGHAM, JR　　2,632,159
RADAR SYSTEM FOR INDICATING MOVING TARGETS
Filed Feb. 19, 1946　　2 SHEETS—SHEET 2

INVENTOR
FREDERIC CUNNINGHAM JR.

BY
William D. Hall.
ATTORNEY

Patented Mar. 17, 1953

2,632,159

UNITED STATES PATENT OFFICE 2,632,159

RADAR SYSTEM FOR INDICATING MOVING TARGETS

Frederic Cunningham, Jr., Belmar, N. J., assignor to the United States of America as represented by the Secretary of War Application February 19, 1946, Serial No. 648,808

7 Claims. (Cl. 343—9)

(Granted under Title 35, U. S. Code (1952), sec. 266)

The invention described herein may be manufactured and used by or for the Government for governmental purposes, without the payment to me of any royalty thereon.

This application relates to radio locating apparatus and more particularly to systems employed to locate the position in space of moving objects.

Radio object locating systems for locating both fixed and moving targets in space are well known in the art. These systems usually locate an object or objects by causing a rotating or scanning directional antenna to transmit a series of high power high frequency, exploratory pulses having a very short time duration. When the radiated exploratory pulses impinge upon an object a portion of this energy is reflected or re-radiated. A portion of this reflected energy is picked up by the system antenna and applied to the system receiver where it is amplified, detected and then applied to some form of indicator. This indicator is usually of the cathode ray tube type and may present the range, azimuth and elevation of the objects causing the reflections.

At the shorter ranges the indications caused by individual objects are sometimes hidden or obscured by the random reflection from minor irregularities of the ground. This random reflection or the indication caused thereby is usually termed ground clutter.

A system of moving target indication has been developed that causes indications to appear on the screen of the system indicator that are the result of the reflection of the transmitted energy by only those objects which are moving with respect to the radio object locating system. The moving target indicating system makes use of the fact that the echoes returned by fixed objects bear a fixed phase relationship to the transmitted signal while echoes returned by moving objects bear a variable phase relationship to the transmitted signal. By beating or combining the returning echo signals with a reference oscillation, signals of constant amplitude are obtained for fixed objects whereas signals having a cyclic variation in amplitude are obtained for moving objects. By using so called fixed object cancelling circuits the signals of constant amplitude may be eliminated leaving only signals resulting from echoes from moving targets. Such a moving target indication system as described above is particularly useful in fixed stations since ground clutter and echoes from permanent structures are eliminated. If the system is to be employed in a moving vehicle such as a truck, tank, ship, or airplane, the system may be modified so that objects moving at a predetermined speed with respect to the vehicle (usually the actual ground speed of the vehicle) will not cause an indication. This permits the system in the moving vehicle to detect other vehicles or objects that are moving with respect to the ground while at the same time eliminating the indication from fixed objects that are none the less moving with respect to the vehicle. For a more detailed description of the basic system reference is made to the copending application of Robert H. Dicke entitled Communication System, Serial No. 590,052, filed April 24, 1945, issued on December 26, 1950, as Patent No. 2,535,274, and details of the system employed in moving vehicles may be found in the copending application of Rubby Sherr, entitled Moving Object Pulse Echo Detection System, Serial No. 624,906, filed October 26, 1945.

One component in the cancelling circuit is a delay type transmission line that delays the received signals for a time equal to the time interval between exploratory pulses so that the amplitude of the delayed signals may be compared with undelayed echo signals resulting from the next succeeding echo pulse. In systems having relatively short maximum ranges and hence a fairly high pulse repetition frequency the length, weight, and size of the delay type transmission line or delay line as it is known as in the art is not prohibitive. In systems that have a very long maximum range it is not necessary and in some cases not desirable to have moving target indications extend to the maximum range of the system, rather it is useful to have the moving target indication extend to say one-third or less of the maximum range of the system and have normal radio object locating system indication from this range to the maximum range of the system. Reducing the maximum range to which the moving target indication extends does not reduce the time that signals must be delayed and hence in existing systems the length, size, and weight of the delay lines is not decreased.

It is an object of the present invention therefore to provide a novel circuit for providing moving target indication to a fraction of the maximum range of a radio object system.

It is a further object of this invention to provide a circuit that will permit the use of a delay that is a fraction the time interval between exploratory pulses and hence will permit the use of a smaller lighter delay line.

Figure 2:
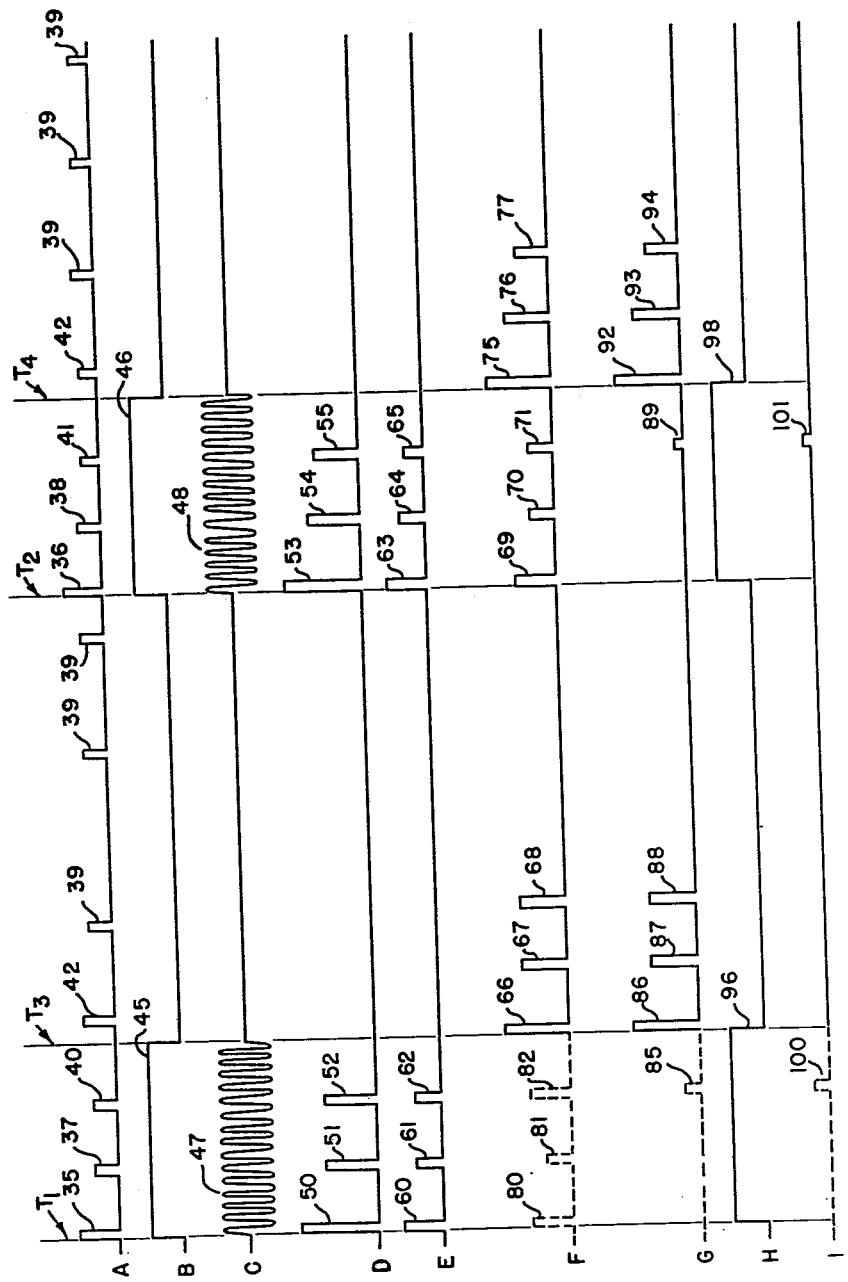

For a better understanding of the invention together with other and further objects thereof, reference is had to the following description taken in connection with the accompanying drawings in which:

Fig. 1 is a schematic diagram in block form of one embodiment of the present invention; and, Fig. 2 is a series of waveforms obtained at various points in the circuit shown in Fig. 1.

In Fig. 1 of the drawings a gate generator 10 is supplied with a synchronizing trigger from an input connection 12. The term gate generator as used in the art is used to denote a circuit that will produce a voltage pulse or gate that has a substantially rectangular waveform when the instantaneous voltage as measured at the output terminals is plotted as a function of time. The leading edge of the pulse or gate usually occurs in time coincidence with the application of a synchronizing pulse and the time of trailing edge of the pulse is usually determined by the constants of the gate generator circuit although it may be determined by the application of a second control pulse. A circuit that is caused to be made operative or inoperative by such a gate voltage is said to be gated into or out of operation. The output of gate generator 10 is applied to a gated oscillator 14 to render this circuit operative for a predetermined interval of time. Oscillator 12 is preferably of the type that will produce an oscillatory voltage of constant amplitude and having a frequency of from 10 to 30 megacycles per second. The output of oscillator 14 is applied to one input of a modulated power amplifier 16. Coherent video signals, that is, video signals derived from combining the echo signals with a reference oscillation as explained in the copending application S. N. 590,052 of Dicke are applied to a second input 18 of modulated power amplifier 16. The output of amplifier 16 is applied to the input of a delay line 20 and an attenuator 22 and the outputs of these two circuit elements are applied to two inputs 24 and 26 respectively of a comparison circuit 28. The output of comparison circuit 28 is applied through a gated video amplifier 30 to a suitable indicator 32. Amplifier 30 is supplied with an activating voltage gate from gate generator 10.

Reference is now made to Fig. 2 of the drawings wherein there are shown voltage waveforms taken at various points in the circuit shown in Fig. 1. Vertical lines passing through all of the waveforms indicate the same instant of time on all waveforms. The vertical scale on all of the waveforms indicates instantaneous voltage values but all of the waveforms are not drawn to the same scale nor has an attempt been made to indicate the actual values of any of the waveforms since in most cases a very wide range of values will work satisfactorily. In all instances, however, where two waveforms or parts of the same waveform must be compared care has been taken to select the relative scales so that the curves most clearly illustrate the point to be made.

Reference is now had jointly to Figs. 1 and 2 of the drawings for a detailed description of the operation of the embodiment of the invention shown in Fig. 1. In Fig. 2 one pulse repetition period of the system, that is, the interval between any two successive exploratory pulses is equal to the time interval between time $T_1$ and time $T_2$. For the purpose of establishing a relative time scale only it may be assumed that the interval $T_1$ to $T_2$ is equal to approximately 600 microseconds. An initiating signal is supplied to generator 10 through input 12 at time $T_1$ and time $T_2$ and at intervals thereafter equal to the interval between times $T_1$ and $T_2$. No waveform of these pulses is shown in Fig. 2 for the reason that their time of occurrence and not their voltage waveshape is important to the operation of this invention. The second input to the circuit shown in Fig. 1 consisting of coherent video signals is made through input connection 18 and is illustrated in Fig. 2A. Pulses 35 and 36 represent two successive exploratory pulses, while pulses 37 and 38 represent successive echoes from a fixed target. Echoes from other fixed targets are illustrated in Fig. 2A by pulses 39. Successive echoes from a moving target are represented by video signals 40 and 41, and successive echoes from a second moving target are represented by pulses 42.

The application of initiating triggers to gate generator 10 causes this circuit to produce voltage gates 45 and 46 illustrated in Fig. 2B of the drawings. It can be seen that gate 45, Fig. 2B, starts at time $T_1$ and extends to a time $T_3$ where the interval between times $T_1$ and $T_3$ is approximately one-third of the interval between times $T_1$ and $T_2$. In a similar manner gate 46 begins at time $T_2$ and extends to a time $T_4$ where the interval between times $T_2$ and $T_4$ is substantially equal to the interval between times $T_1$ and $T_3$. When voltage gates 45 and 46 are applied to gated oscillator 14, Fig. 1, this circuit produces oscillatory voltage wave trains illustrated by wave trains 47 and 48, Fig. 2C. There will be many more oscillations in the wave than there are shown in Fig. 2C but for obvious reasons it is impossible to include all of the oscillations in the drawing. The oscillatory wave trains 47 and 48 are applied to power amplifier 16 wherein they are modulated by the video signals applied through input 18. The waveform shown in Fig. 2D illustrates the positive portion of the modulation envelope of the pulses present at the output of the amplifier 16. The oscillations within these envelopes have been omitted for the sake of clarity, since it will be shown later that, in another embodiment of the invention, the video signals corresponding to the modulation envelope may be used. In Fig. 2D pulses 50, 51, and 52 correspond to pulses 35, 37, and 40, respectively, in Fig. 2A while pulses 53, 54, and 55 correspond respectively to pulses 36, 38, and 41, Fig. 2A. It should be noted that no pulses appear in Fig. 2D corresponding to pulses 39 and 42 for the reason that these pulses occur after times $T_3$ and $T_4$ and at the time of their occurrence no signal is being supplied to amplifier 16 by oscillator 14.

Fig. 2E illustrates the signals present at connection 26, Fig. 1, this connection being the output of attenuator 22. The pulses in Fig. 2E occur in time coincidence with corresponding pulses in Fig. 2D but they are of smaller amplitude due to the action of attenuator 22. Pulses in Fig. 2E are numbered from 60 to 65 both inclusive and in every case a pulse in Fig. 2E corresponds to a pulse in Fig. 2D bearing a reference numeral exactly ten lower than that shown in Fig. 2E.

Fig. 2F illustrates the output of delay line 20. This output may be taken from connection 24, Fig. 1. Delay line 20 in this case may be assumed to be of the liquid delay type well known in the art, and one example of which is shown in Patent No. 2,423,306, that is the type in which a signal is applied to a piezo-electric crystal immersed at one end of a liquid column. This applied signal causes mechanical vibration of the crystal and compressional waves resulting from this vibration travel down the liquid column and impinge upon a second piezo-electric crystal immersed in the other end of the column. The compressional waves upon striking the second crystal set up mechanical stresses therein which in turn cause a voltage to appear between the two faces of the crystal. This signal will closely approximate the signal applied to the first crystal. In most cases the crystal so terminates the liquid column that no reflection of energy takes place but in this invention reflecting cells are employed at each end of the liquid column so that partial reflection of the energy takes place at each end of the column. The reflecting cells may take the form of a crystal that is not matched to the acoustic impedance of the liquid or they may take any other convenient form. In this invention delay line 20 has a time delay that is substantially equal to one-third of the interval between times $T_1$ and $T_2$. In this example delay line 20 would have a delay of approximately 200 microseconds. In Fig. 2F pulses 66, 67, and 68 correspond to pulses 50, 51, and 52 each delayed by an interval equal to the interval between times $T_1$ and $T_3$. This delay is the result of the signal traveling the length of the delay line only once. Pulses 69, 70, 71 again correspond respectively to pulses 50, 51, and 52, but each delayed by a time equal to the interval between times $T_1$ and $T_2$. This delay is the result of the signal traveling the length of the delay line three times. The amplitudes of the signals 69, 70, and 71 are less than the amplitude of the corresponding signals 50, 51, and 52 due to attenuation in the delay line. The constants of attenuator 22 are selected so that the attenuation in this circuit is equal to the attenuation suffered by a signal passing the length of delay line 20 three times. Pulses 75, 76, and 77 correspond to pulses 53, 54. and 55 delayed by one trip through line 20. Dotted pulses 80, 81, and 82 are pulses resulting from a previous exploratory pulse that have been delayed by three trips through delay line 20.

Comparison circuit 28 combines the output of attenuator 22 and delay line 20 in such a manner that the output of the attenuator 22 is subtracted from the output of the delay line 20. This may be done by inverting one of the signals and then adding the two signals. The combined signals in the output of comparison circuit 28 are illustrated in Fig. 2G. Pulses 60 and 61 when combined with pulses 80 and 81 results in zero output. Pulse 62 combines with pulse 82 to form a pulse 85. The resulting pulse 85 is present because pulses 62 and 82 result from the impingement of successive exploratory pulses on a moving object and therefore the coherent video pulses resulting from the reflection of these successive exploratory pulses will have different amplitudes. Pulses 86, 87, and 88 in Fig. 2G result from the fact that there are not pulses in Fig. 2E corresponding in time to pulses 66, 67, and 68 in Fig. 2F. Pulse 89 in waveform 2G is the result of the combination of pulse 65 in Fig. 2E and pulse 71, Fig. 2F. Pulse 89 represents the same moving object as does pulse 85. Pulses 92, 93, and 94 correspond to pulses 75, 76, and 77 in Fig. 2F for which there are no corresponding pulses in Fig. 2E. Pulses 86, 87, 88, 92, 93, and 94 would cause erroneous indications to appear on an indicator if the output of comparison circuit 28 were applied directly thereto, therefore, the output of circuit 28 is passed through gated amplifier 30 to remove the extraneous signals. Fig. 2H illustrates the activating gates applied to amplifier 30 from gate generator 18. Gates 96 and 98 in Fig. 2H correspond in time duration but not necessarily in amplitude to the gates 45 and 46 in Fig. 2B.

Fig. 2I illustrates the signal applied to indicator 32. Pulses 100 and 101 correspond to pulses 85 and 89, Fig. 2G. It was stated that Fig. 2D was the positive portion of the modulation envelope of an oscillatory wave. It follows that Figs. 2E and 2F also represent the positive portions of modulation envelopes of oscillatory waves. Comparison circuit 28 is normally provided with a detector so that Figs. 2G and 2I represent video pulses. Balanced detectors for comparing and detecting two high frequency signals are well known in the art and, one example of such a circuit is shown in "Radio Engineers' Handbook" by Terman, p. 587, first edition, published in 1943, by McGraw-Hill. Indicator 32 may receive azimuth data from a separate source (not shown) and display the moving target indication on a plan position indicator or if desired any other convenient method of displaying the intelligence contained in pulsed 100 and 101 may be employed.

Several obvious modifications of the circuit shown in Fig. 1 will be apparent to those skilled in the art. Attenuator 22 serves only to attenuate the undelayed signals to compensate for attenuation in delay line 20. If comparison circuit 28 is designed to compensate for the attenuation in delay line 20 attenuator 22 may be eliminated. In the circuit shown delay line 20 was taken to be a liquid delay line. Oscillator 14 and modulated amplifier 16 are provided for the reason that a video signal may be passed through such a line with the least distortion by modulating a supersonic frequency with the video signal and then detecting the modulated signal after it has been delayed. It is obvious that if delay line 20 is such that video pulses may be passed with little distortion, as would be the case in an electronic delay line, oscillator 14 may be eliminated and modulated power amplifier 16 replaced by a video amplifier receiving a gate from gate generator 10. It is also obvious that amplifier 30 may not be required, in which case the output of comparison circuit 28 may be applied to indicator circuit 32 in any manner known in the art.

Two points that may need further explanation are first, pulses 42, Fig. 2A, indicate a moving target yet no corresponding pulses appear at the input to indicator 32. This is due to the fact that the object causing pulses 42 is beyond the maximum range of the moving target indication system. If both stationary and moving targets are shown in the range band represented by the time interval between times $T_3$ and $T_2$ pulses 42 as well as pulses 38 will cause a spot or pip to appear on the screen of the indicator.

The second point is that the reflections in delay line 20 will continue after the signals have traveled the length of the delay line three times. It can be seen that signals in the output of comparison circuit 28 as a result of the signal reaching the end of the fifth and seventh trips through the delay line will be eliminated by the gated amplifier 30. Signals resulting from the completion of the ninth trip through the delay line would be passed by amplifier 30 but they are attenuated by delay line 20 to such an extent that they are of no consequence.

While the embodiment of the invention described herein provides for moving target indication to substantially one-third of maximum range of the system other embodiments of the invention may be constructed in which the moving target indication extends to a range equal to the maximum range multipled by the fraction $$\frac{1}{2n-1}$$

where $n$ is any positive integer. The length of the delay line will be correspondingly reduced to $$\frac{1}{2n-1}$$

times the time interval between exploratory pulses. The operation of these embodiments of the invention will be obvious from the description of the embodiment herein shown.

It should be clear from the above description of the invention that this invention possesses many advantages over existing systems, for example, moving target indication has been provided in a system having a relatively low pulse repetition frequency without having to employ a delay line whose delay is equal to the time interval between successive exploratory pulses. This results in a saving of weight, size, and materials. Further, the circuit is so designed that moving target indications may be presented for short ranges without interfering with normal presentations at longer ranges.

Therefore, while there has been described what is at present considered the preferred embodiment of the invention, it should be obvious to those skilled in the art that various further changes and modifications may be made therein without departing from the invention.

What is claimed is:

1. In combination with a radio object locating system adapted to transmit exploratory pulses and to receive object returned echoes and further adapted to derive coherent video signals from said object returned echoes: a moving target indication system comprising; a gate generator means for producing a gate voltage pulse of a time duration approximately one-third of the time interval between the transmission of successive exploratory pulses from said radio object locating system, means for initiating the operation of said gate generator means at the time each of said exploratory pulses is transmitted, a gated oscillator responsive to the output of said gate generator, said oscillator producing an oscillatory voltage of relatively high frequency during the time it is gated into operation by the signal from said gate generator, a modulated power amplifier, means for respectively applying both the output of said oscillator and said coherent video pulses to said modulated power amplifier whereby the output of said power amplifier consists of pulses of oscillatory energy having modulation envelopes corresponding substantially to the amplitude of said coherent video signals, a delay means provided with reflecting end cells, an attenuator, means for applying the output of said modulated amplifier to both the input of said delay means and the input of said attenuator, comparison means connected to said delay means and said attenuator for obtaining a signal corresponding to the difference between the outputs of said delay means and said attenuator, a gated amplifier means responsive to the output of said gate generator, an indicator and means for applying the output of said comparison means to said indicator through said gated amplifier whereby signals reaching said indicator result only from the echoes caused by reflection of exploratory pulses from a moving object.

2. Apparatus in accordance with claim 1 in which said delay line is a liquid delay line having transmitting and receiving piezoelectric crystals disposed at the ends thereof, said delay line producing a time delay in signals passing therethrough, substantially equal to one-third the time interval between exploratory pulses.

3. In combination with a source of a plurality of series of video pulses, all of said series having the same given repetition period and being displaced in time relative to one another; an apparatus for passing only those series of pulses having an amplitude modulation envelope; said apparatus comprising a delay line having a length which provides a delay equal to $$\frac{1}{2n-1}$$

times said given repetition period, where $n$ equals any positive integer, said delay line having a reflection coefficient at both the input and output ends thereof, means for generating a series of gate impulses having said given repetition period, each of said gate pulses having a duration at most equal to $$\frac{1}{2n-1}$$

times said given repetition period, first translating means gated by said gate pulses for coupling said source to the input end of said delay line, comparison means having first and second input terminals for producing an output proportional to the difference in the amplitude of signals applied respectively to said first and second input terminals, equalizing means coupling one end of said delay line to said first input terminal, means for coupling the other end of said delay line to said second input terminal, said equalizing means compensating for the attenuation suffered by a signal making $(2n-1)$ trips through said delay line, indicating means, and second translating means gated by said gate pulses for applying the output of said comparison means to said indicating means.

4. The combination according to claim 3, wherein $n$ equals 1.

5. The combination according to claim 3, wherein said delay line is a mechanical delay line, and wherein said first translating means includes an oscillator gated by said gate pulses and an amplifier gated by the oscillations of said oscillator, said source being connected as an input to said amplifier.

6. The combination according to claim 3, wherein said source consists of a transmitter of high frequency exploratory pulses and a receiver having an output consisting of coherent video pulses resulting from the reception and detection of that portion of the transmitted energy reflected by objects in space.

7. The combination according to claim 3, wherein said one end of said delay line is the input end thereof, and said equalizing means is an attenuator.

FREDERIC CUNNINGHAM, Jr.

REFERENCES CITED

The following references are of record in the file of this patent:

UNITED STATES PATENTS

| Number | Name | Date |
|---|---|---|
| 2,266,401 | Reeves | Dec. 16, 1941 |
| 2,412,994 | Lehmann | Dec. 24, 1946 |
| 2,421,340 | Levy | May 27, 1947 |
| 2,491,450 | Holmes | Dec. 13, 1949 |
| 2,523,283 | Dickson | Sept. 26, 1950 |
| 2,532,546 | Forbes | Dec. 5, 1950 |